US00RE35992E

United States Patent [19]

Huis et al.

[11] E Patent Number: Re. 35,992

[45] Reissued Date of Patent: Dec. 15, 1998

[54] CARD READER CONTACTS AND NON-CONTACT COILS ON A PRINTED CIRCUIT BOARD

[75] Inventors: Heinrich Huis, Obereisesheim; Bernd Schuder, Schwaigern, both of Germany

[73] Assignee: Amphenol-Tuchel Electronics GmbH, Heilbronn, Germany

[21] Appl. No.: 831,512

[22] Filed: Apr. 1, 1997

Related U.S. Patent Documents

Reissue of:

[64] Patent No.: 5,550,361
Issued: Aug. 27, 1996
Appl. No.: 284,120
Filed: Aug. 2, 1994

[30] Foreign Application Priority Data

Aug. 3, 1993 [DE] Germany ..... 43 26 029.2

[51] Int. Cl.[6] ..... G06K 7/10

[52] U.S. Cl. ..... 235/440; 235/441

[58] Field of Search ..... 235/435, 437, 235/440, 441, 449, 384; 361/748, 749

[56] References Cited

U.S. PATENT DOCUMENTS

| | | | |
|---|---|---|---|
| 1,647,474 | 11/1927 | Seymour | 361/749 |
| 2,884,571 | 4/1959 | Hannahs | 361/748 |
| 2,885,601 | 5/1959 | Pessel | 361/748 |
| 2,911,605 | 11/1959 | Wales, Jr. | 361/749 |
| 4,029,945 | 6/1977 | Yamada et al. | 235/439 |
| 4,146,781 | 3/1979 | Machate | 235/439 |
| 4,668,913 | 5/1987 | Vinal | 235/449 |
| 4,692,604 | 9/1987 | Billings | 235/449 |
| 4,960,983 | 10/1990 | Inoue | 235/449 |
| 5,124,535 | 6/1992 | Kocznar et al. | 235/380 |
| 5,382,781 | 1/1995 | Inoue | 235/440 |

FOREIGN PATENT DOCUMENTS

| | | |
|---|---|---|
| 0472420 | 2/1992 | European Pat. Off. . |
| 3721822C1 | 11/1988 | Germany . |
| 3824870A1 | 4/1989 | Germany . |
| 3810275A1 | 10/1989 | Germany . |
| 3803019C2 | 4/1990 | Germany . |
| 3935364C1 | 8/1990 | Germany . |

*Primary Examiner*—Anita Pellman Gross
*Assistant Examiner*—Mark Tremblay
*Attorney, Agent, or Firm*—Bacon & Thomas, PLLC

[57] ABSTRACT

A reader for contactless data cards includes a printed circuit, contacts for establishing contact with a contact-type data card, and at least one drive coil for transmitting in contactless manner energy and data between the printed circuit and a data medium on the data card. The at least one drive coil forms a component of the printed circuit and the printed circuit in turn includes a flexible portion which establishes an electrical connection to outside the reader for both the contacts and the drive coil, thereby reducing the height of the reader. A variety of carriage configurations may be provided to bring the drive coils and/of contacts into proximity with the card, or for bringing the card into proximity with the drive coils and/or contacts in order to avoid wear on the contacts and ensure a good electromagnetic coupling between the drive coils and the card when the card is of the contactless type.

8 Claims, 3 Drawing Sheets

CARD READER CONTACTS AND NON-CONTACT COILS ON A PRINTED CIRCUIT BOARD

Matter enclosed in heavy brackets [ ] appears in the original patent but forms no part of this reissue specification; matter printed in italics indicates the additions made by reissue.

BACKGROUND OF THE INVENTION

1. Field of the Invention

The invention concerns a reader for contactless data cards.

2. Description of Related Art

Cards fitted with a magnetic strip or an electronic chip are currently used in a variety of applications, for example in telephones, to feed stored data to an associated reader and for receiving data from the reader. One such card, which is fitted with an electronic chip and thus referred to as a chipcard, is disclosed in German patent document C1 39 35 364. In this chipcard, the energy supply and the bi-directional exchange of data may take place through contacts or in contactless manner through the use of coils for supplying energy and for serving in the data exchange which are present in the area of the contacts. Another chipcard reader which operates by means of electromagnetic, contactless power and/or signal transmission with a stationary circuit is disclosed in German patent document C1 37 21 822. The antenna coil provided for transmission in this chipcard is mounted concentrically around the active surface of the semiconductor of the integrated circuit on the card.

Data cards for which the exchange of data is implemented by means of contacts are disadvantageous because the contact area, in particular, is subject to abrasion which may interfere with operation of the contacts. As a result, readers have been developed in which the contacts are mounted on a displaceable carriage which is lowered essentially vertically onto the appropriate contacts of the chipcard, thereby preventing relative motion between the contacts of the card and those of the reader. However, such readers are unsuitable when using contactless data cards. Conversely, contactless readers of the type disclosed in the above-cited German patent document C1 37 21 822 cannot be used to read contact-type chipcards.

While the reader disclosed in German patent document C1 39 35 364, cited above, provides for operation of the chipcard in both a contactless manner and through the use of contacts, the coils for supplying energy and for serving in the data exchange being present in an area of contacts, the arrangement of the coils in this reader is disadvantageous because it requires increasing the height of the reader.

SUMMARY OF THE INVENTION

It is accordingly an objective of the present invention to provide a reader for both contact-type and contactless data cards which avoids the disadvantages of the prior art by minimizing both contact wear and the height of the reader.

This objective is accomplished, according to several preferred embodiments of the invention, by providing a reader for contactless data cards in which the drive coil or coils is a component of a printed circuit which also serves as a plug-in connection for the reader.

More specifically, the preferred embodiments of the invention include a printed circuit, a set of contacts belonging to the circuit, and at least one drive coil which forms a component of the printed circuit and which is provided to establish a contactless connection for transmitting energy and data between the printed circuit and a data medium on the data card, and at least one corresponding magnetic yoke is provided to establish a magnetic return in the area of the printed circuit.

To prevent contact wear, the set of contacts in the respective embodiments may either be lowered as needed, provided in a reader with a descending carriage, or provided in an immovable reader with slip contacts.

In one of the preferred embodiments of the invention, the at least one drive coil in the form of a printed circuit component is provided on a carriage and lowered, together with the descending contacts provided on the carriage, onto the card as soon as the card has been inserted in the reader, resulting in a minimized magnetic circuit air gap and decreased power requirements in the reading position.

Because the at least one drive coil is provided as part of the reader printed circuit board, the input/output connectors of the drive coil can be implemented across a flexible hook-up area of the board and thereby the coil does not need a plug-in connector of its own.

The advantage of avoiding the need for separate connectors is especially pronounced for the situation in which the reader can simultaneously also make contact with contact-fitted chipcards, because in such a situation all electrical connectors can be made to pass through a single flexible connection zone of the printed circuit board in a common plug-connector. Furthermore, the flexible connection zone of the printed circuit board also allows compensation of displacement tolerances when the plug-connector is stationary and can be folded into at least two superposed layers in a convoluted manner, which allows higher energies to be transmitted by the drive coils than would be possible if the coils were just in a single layer. Depending on the application, the printed circuit may include two drive coils, one for transferring data to the card and one for reading data from the card.

In the preferred embodiment, the magnetic return passes through a magnetic yoke, which may extend through the printed circuit board. This feature is especially easily implemented in one embodiment of the invention, in which the entire printed circuit board is one flexible component, i.e., the board and the connection zone are integral. The magnetic yoke may be cross-sectionally U-shaped.

As already discussed above, the described embodiment also allows using the reader for chipcards with contacts. For that purpose the board includes additional contact strips electrically connected to corresponding contacts which, in their plugged-in position, project toward the card and which can be actuated by means of the single plug connector provided across the flexible connection zone of the board.

The contact assembly of the reader preferably corresponds to the state of the art except for the configuration of the printed circuit board. However, the integral design of reader, which provides at least one drive coil in the form of a printed circuit to transmit energy and data in contactless manner between the printed circuit and the data card, is novel.

As a rule, the contacts arc elastically prestressed and, because of their positioning in a descending carriage (at least in one preferred embodiment of the invention), there will be minimal contact abrasion for the contacts. At the same time, the cost of the connectors and components is reduced. The reader may be alternatingly used for contactless data cards and for data cards with contacts.

These and other advantages of the invention will become apparent to those skilled in the art from the following description and accompanying drawings.

Identical or effectively identical components are denoted by the same references in the Figures.

DETAILED DESCRIPTION OF THE PREFERRED EMBODIMENTS

Figure 1:
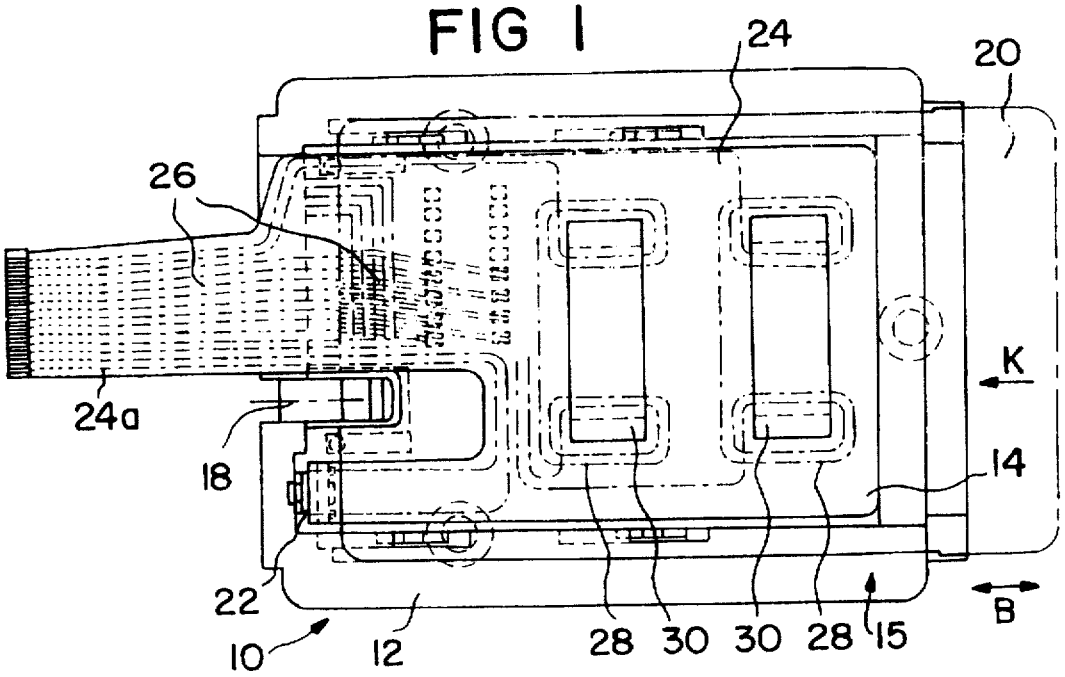
FIG. 1 is a top view of a data card reader according to a preferred embodiment of the invention.

The reader 10 shown in FIG. 1 includes a frame 12 and of a carriage 14 guided in the frame 12 and displaceable in the direction of arrow B both into and out of the plane of the drawing. The side guides between the frame 12 and the carriage 14 are denoted by reference numeral 16. Readers of this general design are known for instance from German patent document A1 38 10 275, and thus further discussion of the configuration of the frame 12 and the carriage 14 is not included herein. Together the components 12, 14, 16 form a housing 15.

FIG. 1 furthermore shows a so-called card brake 18 which extends elastically into the path of a data card 20 being inserted into the reader in the direction of the arrow K, and a limit switch 22 which actuates the reader assembly as soon as the card 20 has reached its reading position.

A flexible printed circuit board 24 which carries a printed circuit 14 is mounted on the carriage and includes two drive coils 28 and contact strips denoted as a whole by reference numeral 26. The contact strips 26 are electrically connected to downward-projecting mechanical contacts (not shown), the connection for instance being by solder spots, with the mechanical contacts extending into carriage 14.

As shown in FIG. 1, the contact strips run through a flexible connection zone 24a of a printed circuit board 24, zone 24a projecting beyond the frame 12. The electrical connection strips for the coils 28 in flexible printed circuit 14 run parallel to the contact strips 26 on the flexible contact zone 24a, as a result of which all electrical connections can be established via the free end of the flexible zone 24a by means of a plug connector (not shown).

Figure 2:
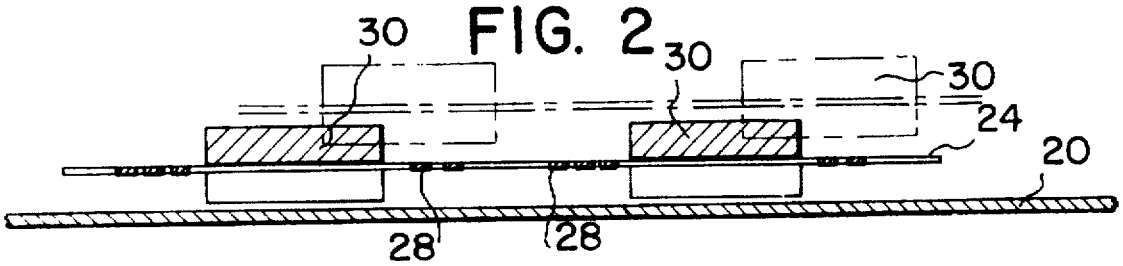
FIG. 2 is a side view showing the configuration of a descending carriage relative to the card in the embodiment of FIG. 1.
Figure 3:
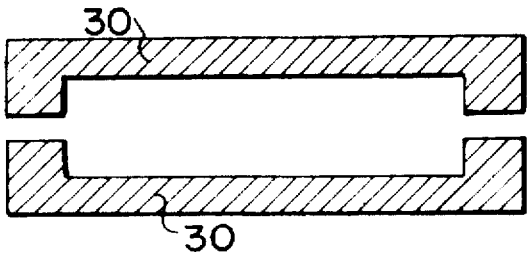
FIG. 3 is a side view of an embodiment a magnetic yoke for the magnetic return in the embodiment of FIG. 1.

Two magnetic yokes 30 associated with the coils 28 are shown in FIG. 1 and in more detail in FIGS. 2 and 3. Each magnetic yoke 30 is cross-sectionally U-shaped and passes through the printed circuit board 24. The arrangement of the carriage 14 and the board 24 relative to the data card 20 is shown in FIG. 2 as follows: the position in which a data card has been inserted for reading, is shown by solid lines, while the position in which the data card 20 is absent from the reader 10 is shown by dashed lines.

As seen from FIG. 2, the carriage 14 is guided both in the direction of the arrow K and also toward the card 20 as the card is being inserted. During such a displacement, the coils 28 in the form of printed circuits on the board 24 at the carriage 14 are also concurrently displaced, such that the air gap of the magnetic circuit is reduced in the reading state, but reaches its maximum in the inactive state, i.e., when the card is absent.

Because the carriage 14 and the card 20 are lowered together in this embodiment, card abrasion by the downwardly projecting mechanical contacts remains slight while, simultaneously, good magnetic coupling is achieved in the active position.

The reader shown in FIGS. 1–3 also can be used with data cards which make contact through the mechanical contacts of the carriage 14. As shown, both the mechanical contacts and the coils 28 may be electrically connected through a single plug connector. This is made possible by causing the corresponding contact strips pass over the common, flexible connection zone 24a of the printed circuit board 24 into the plug connector.

Figure 4:
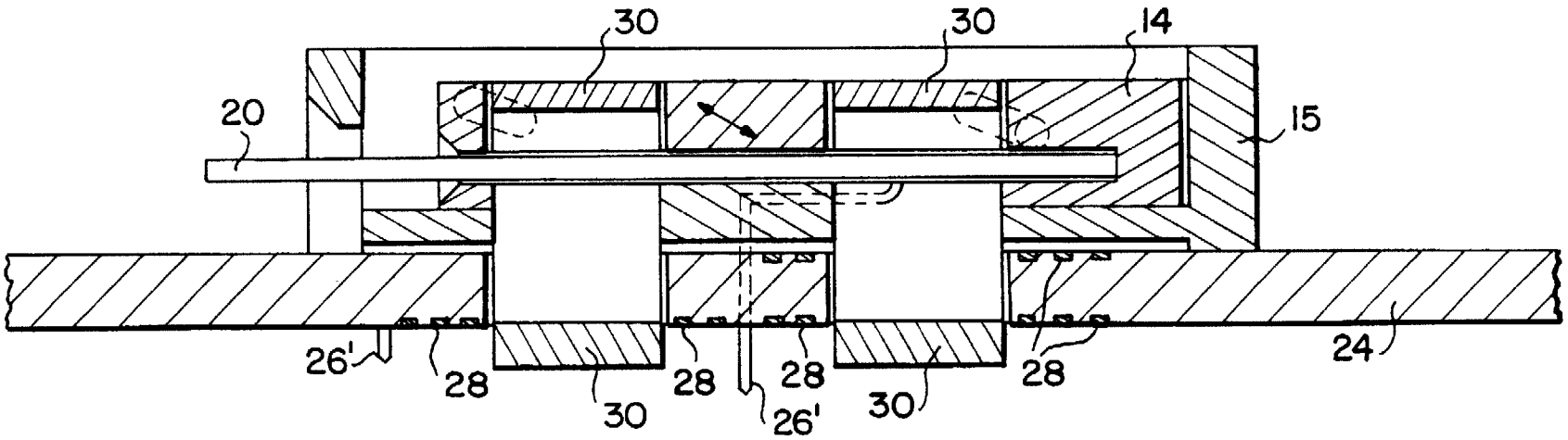
FIG. 4 is a partial section of second embodiment of the invention, in which the data card descends into the reader.

The embodiment FIG. 4 shows a combined reader for a descending data card 20. Such readers are generally known and therefore need not be exhaustively described in further detail herein. They always include a housing 15 receiving a sliding carriage 14 and a stationary printed circuit board 24. The carriage 14 is lowered in the direction of board 24 as soon as the card 20 reaches its rear limit position shown in FIG. 4 and the user applies compression to the card 20.

Various soldered terminals or contacts 26' project downward from the area of the board 24, only a few being shown for the sake of clarity. The soldered terminals pass through the printed circuit board 24 and enter the housing 15 into which they are firmly integrated, the card being lowered by carriage 14 onto the stationary contacts 26' as a result of which the relative displacement between the data card 20 and the contacts 26' is minimized in this embodiment. The free contact ends are prestressed and project out of the housing 15 so that they come to rest against the inserted card 20. Two mutually spaced magnetic yokes 30 are mounted in the board 24 and pass through it to enter the region of the housing 15. Each magnetic yoke 30 consists of two parts, of which the second one is mounted in the carriage 14.

FIG. 4 also shows that a drive coil 28 is mounted on each side of the magnetic yoke 30 which is positioned on the left side of the reader as illustrated in this figure, on the lower side of the board 24, whereas the drive coils 28 in the area of the magnetic yoke 30 which is illustrated in the figure as being on the right side of the reader arc mounted in the form of components of printed circuitry both on the top and bottom sides of board 24.

This reader as well as the one described in relation to FIGS. 1–3 offers the advantage of low height and simple connection through the contacts 26 and 26' to a corresponding plug connector. Moreover, the reader of these embodiments allows high energy transmission optimized by the arrangement of drive coils on both sides of the printed circuit board relative to the associated printed circuitry.

Figure 5:
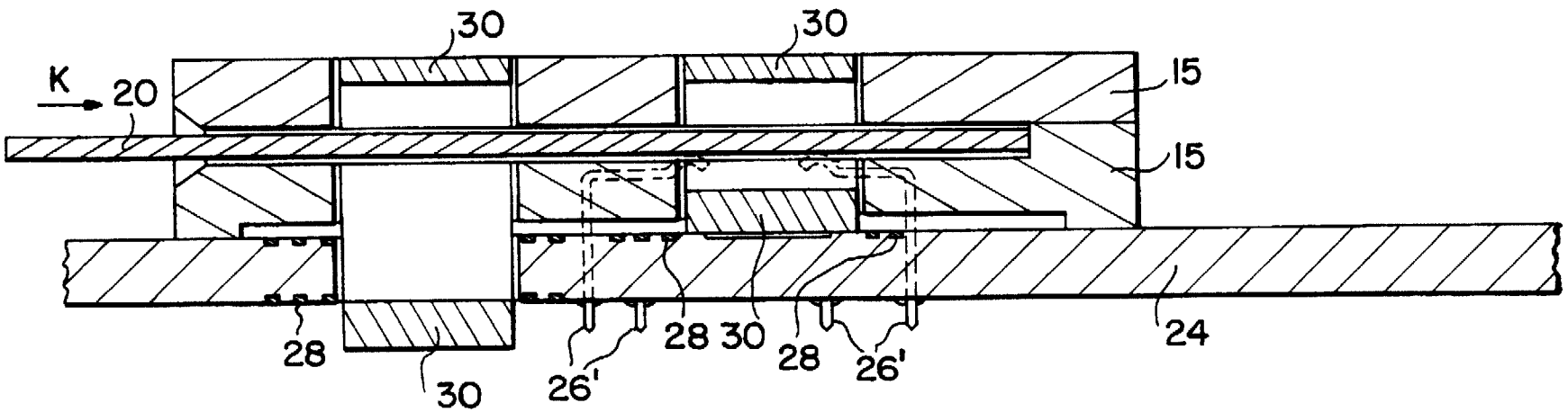
FIG. 5 is a partial section of a third embodiment of the invention, which does not include a descending card or contacts.

The embodiment of FIG. 5 is substantially similar to that of FIG. 4 except that the housing 15 is stationary as a whole and in that it includes a housing cover instead of the descending carriage. The integrated-data card 20 is inserted in the direction of the arrow 20 and moved into the limit position shown in the figure. In this embodiment, as in the other embodiments, electromagnetic power is transmitted by means of suitably configured magnetic yokes 30 and drive coils 28. However, the two magnetic yokes 30, each made up of two pans, have different geometries as illustrated in FIG. 5. Whereas the lower part of the left magnetic yoke 30 is soldered onto the lower side of the board 24, the upper part of the left magnetic yoke is integrated into the housing cover. This latter design also applies to the upper part of the right magnetic yoke 30, but the lower part is soldered to the top side of the board 24. This is in contrast to the embodiment of FIG. 4, in which the drive coil 28 is integrated as corresponding printed circuitry into the area of the right magnetic yoke 30 on both sides of the printed circuit board 24, while the left drive coil 28 merely runs on the top side of said board 24.

The embodiments of FIGS. 4 and 5, like that of FIGS. 1–3, allows transmission of high energies by providing several printed circuit boards kept apart by insulating layers or by mounting flexible conducting strips similar to those of the embodiment of FIGS. 1–3 on the top and bottom of said board. Where appropriate, the layers may also be folded in a convoluted manner, but in any event the drive coils are integrated into the printed circuitry and the associated magnetic yokes. Preferably, in these embodiments, the printed circuit board consists of a base body coated on at least one side with a foil comprising the printed circuitry and the drive coils.

It will of course be appreciated by those skilled in the art that the above description does not exhaust the variations and modifications of the invention which will occur to those skilled in the art and which are intended to be included within the scope of the invention. Consequently, it is to be understood that the above description and drawing figures are not to be taken as limiting, but rather that the invention should be limited solely by the appended claims.

We claim:

1. A reader for a contactless data card, comprising:

a printed circuit including at least one drive coil;

at least one corresponding magnetic yoke, wherein the at least one drive coil forms a means for establishing a contactless connection for transmitting energy and data between the printed circuit and a data medium on the data card, and wherein the magnetic yoke is positioned to establish a magnetic return for the at least one drive coil;

a carriage arranged to descend toward a data card being inserted into the reader, and a printed circuit board which carries said printed circuit and which is affixed to the carriage, said circuit board including a flexible connection zone extending out of the reader, wherein the printed circuit board comprises contact strips electrically connected to corresponding contacts which project toward the card in an inserted position of the card, and wherein an electrical connection for both the at least one drive coil and the contact strips to an electrical connector is established by means of the flexible connection zone.

2. A reader as claimed in claim 1, wherein the printed circuit board is completely flexible.

3. A reader as claimed in claim 1, wherein the printed circuit board is folded to form at least two superposed layers.

4. A reader as claimed in claim 1, wherein said at least one drive coil which forms a component of the printed circuit includes two mutually spaced but adjacent coils.

5. A reader as claimed in claim 1, wherein electrical connection strips of the at least one drive coil run parallel to the contact strips electrically connected to the contact in the common flexible connection zone.

6. A reader as claimed in claim 1, further comprising a stationary housing arranged to receive a data card, and wherein the printed circuit is a component of a printed circuit board affixed to the housing and the at least one drive coil is mounted on surfaces of the board selected from the group consisting of the surface which faces the data card, the surface which faces away from the data card, and both the surface which faces the data card and the surface which faces away from the data card.

7. A reader as claimed in claim 6, wherein the housing comprises a carriage arranged to receive the data card and in response descend in the direction of the printed circuit board.

8. A reader as claimed in claim 6, wherein the printed circuit board consists of a base body coated on at least one side with a foil comprising the printed circuitry and the at least one drive coil.

* * * * *